United States Patent [19]
Haire et al.

[11] Patent Number: 5,407,221
[45] Date of Patent: Apr. 18, 1995

[54] CONVERTER DOLLY

[75] Inventors: Darrell K. Haire; Andrew R. Haire, both of Thomasville, N.C.

[73] Assignee: A.M. Haire Truck Bodies, Inc., Thomasville, N.C.

[21] Appl. No.: 184,273

[22] Filed: Jan. 21, 1994

[51] Int. Cl.$^6$ .................... B62D 53/00; B62D 53/10
[52] U.S. Cl. .................... 280/476.1; 280/432; 280/901; 280/DIG. 14
[58] Field of Search .................... 280/476.1, 432, 901, 280/DIG. 14

[56] References Cited

U.S. PATENT DOCUMENTS

| | | |
|---|---|---|
| 2,309,204 | 1/1943 | Nelson . |
| 2,344,921 | 3/1944 | McDaniel . |
| 2,495,943 | 1/1950 | Peterson . |
| 2,590,962 | 4/1952 | Gurton et al. . |
| 2,639,159 | 5/1953 | Milligan et al. . |
| 2,816,776 | 12/1957 | Nimtz . |
| 3,556,560 | 1/1971 | Adams . |
| 3,827,723 | 8/1974 | Neff et al. . |
| 3,963,265 | 6/1976 | Kornoelje et al. . |
| 4,119,330 | 10/1978 | Capps ........................ 280/432 |
| 4,120,514 | 10/1978 | Sanders ...................... 280/432 |
| 4,162,082 | 7/1979 | Curry . |
| 4,230,335 | 10/1980 | Glassmeyer . |
| 4,365,820 | 12/1982 | Rush . |
| 4,556,232 | 12/1985 | Sever ......................... 280/432 |
| 4,573,699 | 3/1986 | Smith ......................... 280/432 |
| 4,611,821 | 9/1986 | Jeanson et al. ............. 280/482 |
| 4,775,165 | 10/1988 | Grovum ...................... 280/432 |
| 4,930,800 | 6/1990 | Jean-Luc .................... 280/446.1 |
| 4,993,737 | 2/1991 | Torcomian ................. 280/407 |
| 5,098,115 | 3/1992 | Haire et al. ................ 280/476.1 |

Primary Examiner—Mitchell J. Hill
Attorney, Agent, or Firm—Bell, Seltzer, Park & Gibson

[57] ABSTRACT

A converter dolly for connecting a second trailer in tandem to a first trailer is provided. The converter dolly comprises a base, a connector frame pivotally connected to the base for horizontal movement about a substantially vertical axis, a dolly locking structure, and a plurality of ground engaging wheels carried by the base. The connector frame includes a hitch for pivotally connecting the connector frame to the forward wheeled vehicle for substantially horizontal movement about a substantially vertical axis, and a fifth wheel assembly fixed on the connector frame to pivotally connect the connector frame to the rear wheeled vehicle for substantially horizontal movement about a substantially vertical axis. The fifth wheel assembly includes a fifth wheel locking having an unengaged position and an engaged position for preventing rotational movement between the connector frame and the rear wheeled vehicle in its engaged position. The dolly locking structure is in its unengaged position when the fifth wheel locking means is in its engaged position to thereby facilitate maneuverability during reverse motion of the tandem trailer assembly.

15 Claims, 5 Drawing Sheets

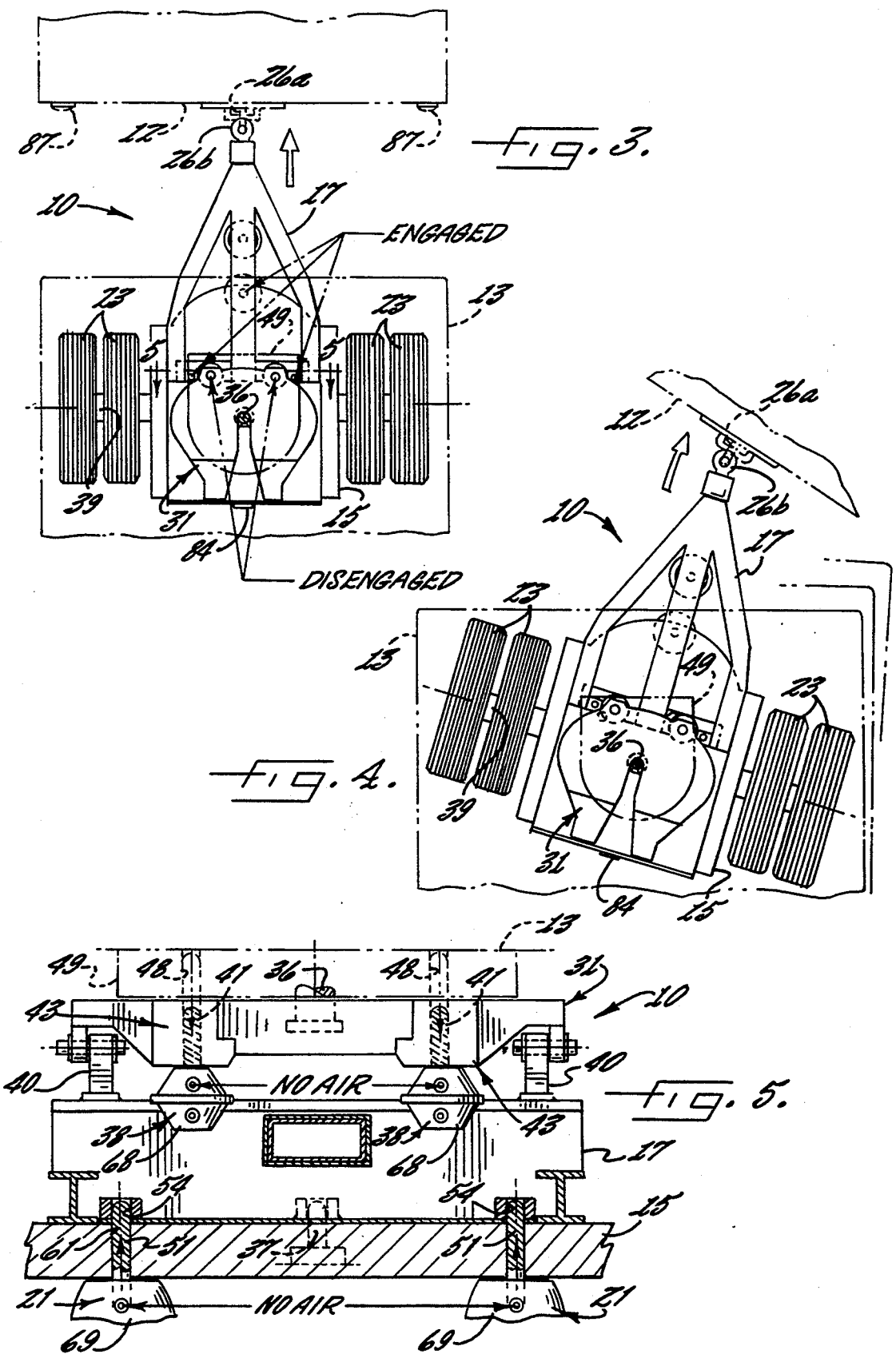

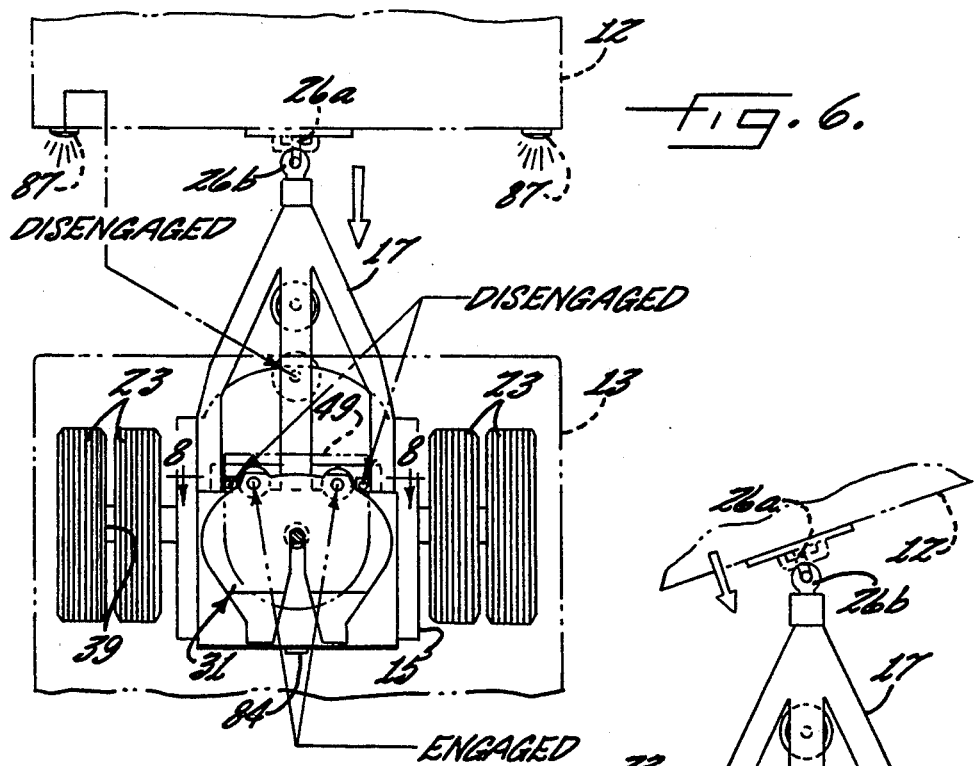
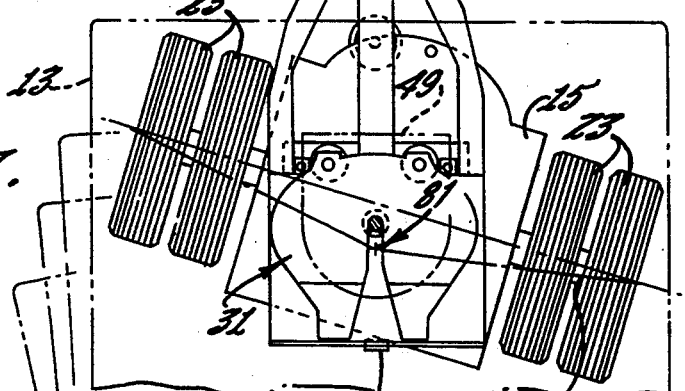
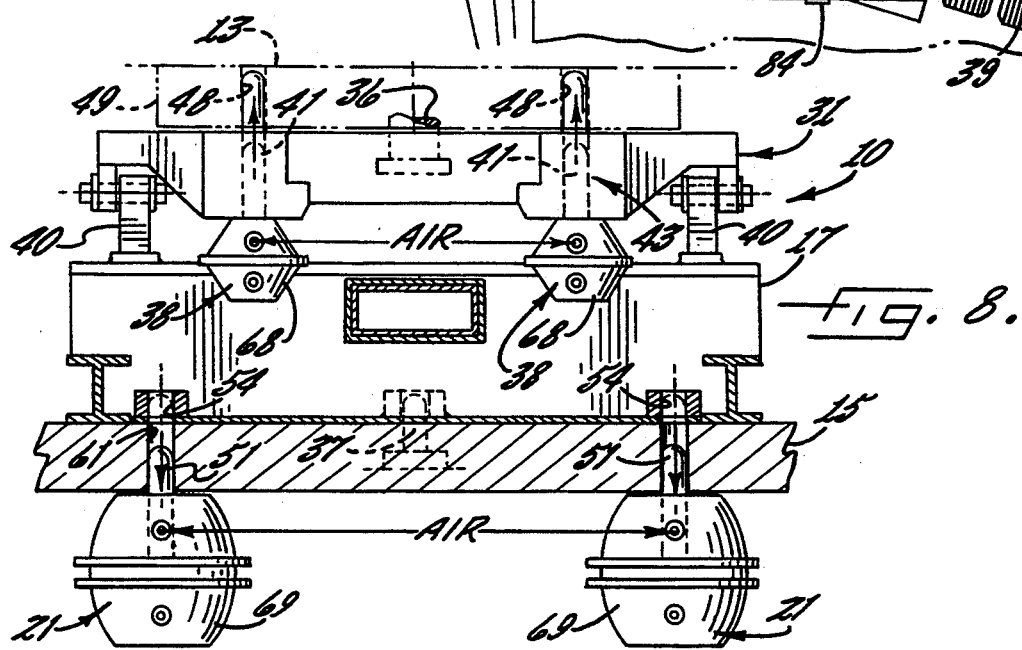

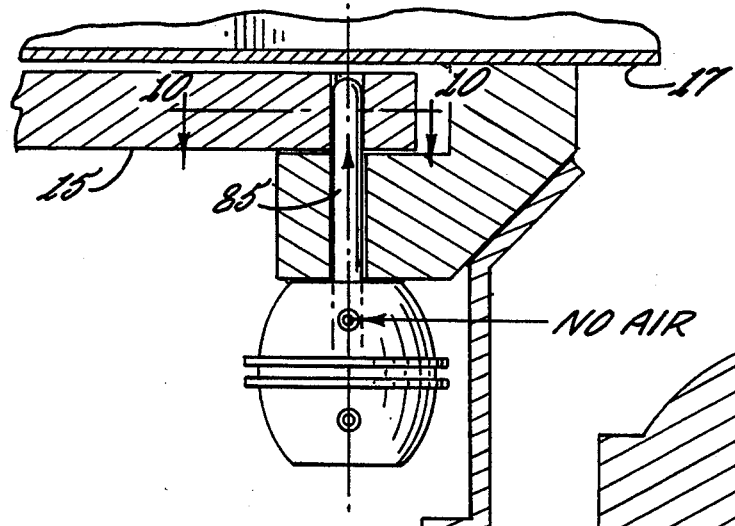
_Fig. 9._
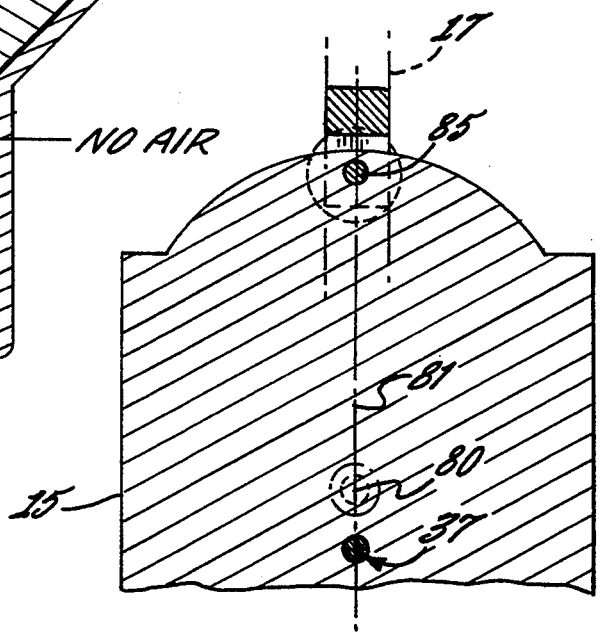
_Fig. 10._
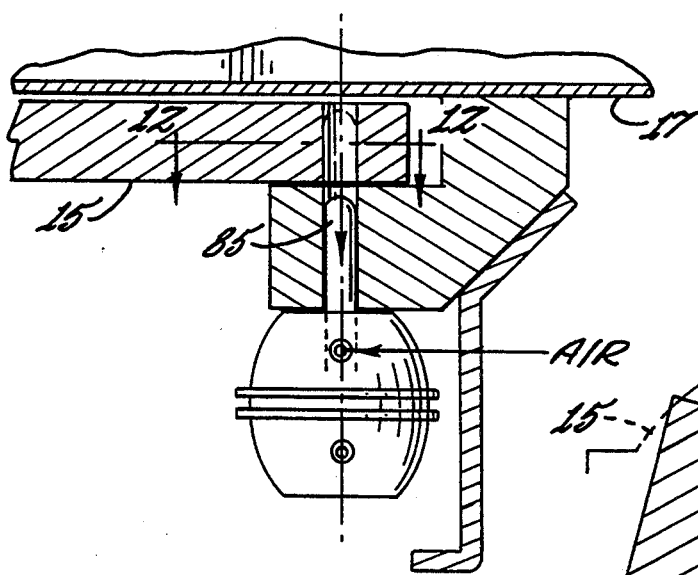
_Fig. 11._
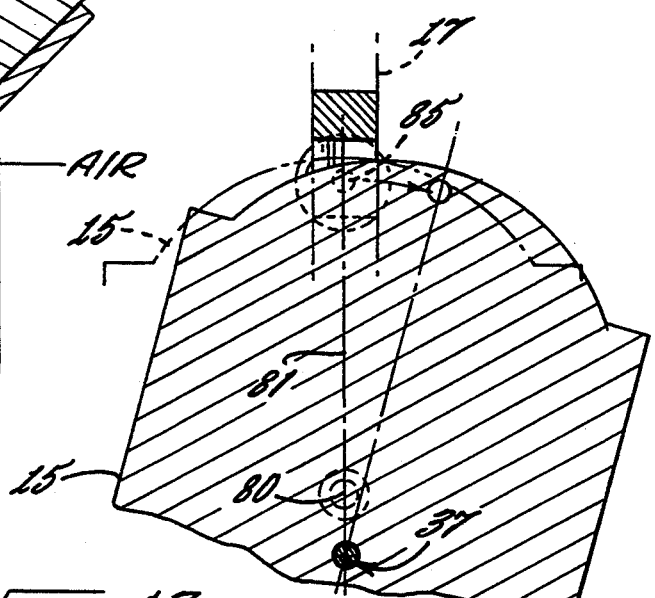
_Fig. 12._

CONVERTER DOLLY

FIELD AND BACKGROUND OF THE INVENTION

The present invention relates to tandem trailer assemblies wherein trailers are pulled by a single truck tractor, and the difficulties involved in backing up the same.

The use of tandem trailers has become increasingly popular in recent years. The tandem arrangement permits a single truck to double its hauling capacity which feature is particularly advantageous in the moving industry. For instance, it is often desirable to move furniture in one trailer and move an automobile in a second trailer whereas in the past the automobile had to either be driven or towed behind the first trailer.

In operation, the first trailer is an integral truck cab assembly or is connected to the tractor using a fifth wheel and kingpin arrangement commonly known in the art. The second trailer is conventionally attached to the first trailer using a dolly carrying another fifth wheel assembly. These arrangements can provide pivot points between the tractor and the first trailer, between the first trailer and the dolly, and between the second trailer and the dolly. This arrangement does not significantly increase the cost to pull the two trailers and there is little or no loss in maneuverability so long as the tractor and trailers are traveling in a forward direction.

A problem occurs, however, when the driver of the tractor desires to back up the trailer assembly such as when delivering or picking up a load. The trailers must be disconnected from one another and separately backed up. This is due to the arrangement of the pivot points. While this arrangement is advantageous as to maneuverability, it is unsuitable for backing up the assembly because of the unmanagability of the pivot points. Conceivably the trailers can be disconnected and individually reversed and positioned, but this process obviously is time consuming and thus expensive.

Prior art devices are known which limit the pivotal movement of the converter dolly in relation to the first trailer. For instance, commonly assigned U.S. Pat. No. 5,098,115 to Haire et al. proposes such limiting means. Specifically, Haire et al. proposes a converter dolly comprising a fifth wheel which carries locking means including pins moveable between a retracted, inactive position for permitting pivotal movement of the second trailer during forward motion and an extended, active position for engagement with the second trailer to restrain the second trailer against pivotal movement during the backing up of the trailer assembly. During the backing up procedure, only two pivot points are unrestrained (i.e., between the tractor and the first trailer and between the first trailer and the converter dolly).

It is an object of this invention to provide a converter dolly which obviates the need to disconnect the trailers to back-up the assembly.

Another object of this invention is to provide a trailer assembly which is easily maneuverable either in the forward or reverse motion.

A further object of this invention is to provide a converter dolly which is operator friendly and which exhibits safety features.

SUMMARY OF THE INVENTION

In accordance with the present invention, applicants provide a converter dolly for connecting tandem trailers which eliminates the problems of the prior art assemblies during backing up maneuvers. The converter dolly is adapted to be coupled to the rear of a first trailer for pivotal substantially horizontal movement about a substantially vertical axis. The dolly comprises a base, a connector frame pivotally connected to the base for horizontal movement about a substantially vertical axis, a dolly locking means, and a plurality of ground engaging wheels carried by the base. The connector frame includes a hitch means for pivotally connecting the connector frame to the forward wheeled vehicle for substantially horizontal movement about a substantially vertical axis, and a fifth wheel assembly fixed on the connector frame to pivotally connect the connector frame to the rear wheeled vehicle for substantially horizontal movement about a substantially vertical axis. The fifth wheel assembly includes a fifth wheel locking means having an unengaged position and an engaged position for preventing rotational movement between the connector frame and the rear wheeled vehicle in its engaged position. The dolly locking means is in its unengaged position when the fifth wheel locking means is in its engaged position to thereby facilitate maneuverability during reverse motion of the tandem trailer assembly.

BRIEF DESCRIPTION OF THE DRAWINGS

The foregoing and other objects, features, and advantages of the present invention will be made apparent from the following detailed description of the preferred embodiment of the invention, and from the drawings, in which:

FIG. 3 is a top plan view of the converter dolly when the trailer assembly is in a forward position.

FIG. 4 is a top plan view of the converter dolly showing the pivot points of the trailer assembly in forward motion.

FIG. 5 is a cross-sectional view of the locking means of the dolly in forward position taken along line 5—5 of FIG. 3.

FIG. 6 is a top plan view of the converter dolly when the trailer assembly is in a backing up position.

FIG. 7 is a top plan view of the converter dolly when the trailer assembly is being turned and maneuvered during a backing up procedure.

FIG. 8 is a cross-sectional view of the locking means of the dolly in backing up position taken along line 8—8 of FIG. 6.

FIG. 9 is a cross-sectional view of the fail-safe pin taken along line 9—9 of FIG. 2.

FIG. 10 is a horizontal, cross-sectional view of the converter dolly taken along line 10—10 of FIG. 9 which depicts the off-centered pivot point between the connector frame and base.

FIG. 11 is a cross-sectional view of the fail-safe pin in a retracted, inactive position.

FIG. 12 is a horizontal, cross-sectional view of the converter dolly taken along line 12—12 of FIG. 11 which depicts the pivotal relationship between the connector frame and base when the fail-safe pin is in a retracted, inactive position.

DETAILED DESCRIPTION OF THE INVENTION

The present invention will now be described more fully hereinafter with reference to the accompanying drawings, in which preferred embodiments of the invention are shown. This invention should not, however, be construed as limited to the embodiments set forth herein; rather, applicant provides these embodiments so that this disclosure will be thorough and complete, and will fully convey the scope of the invention to those skilled in the art.

Figure 1:
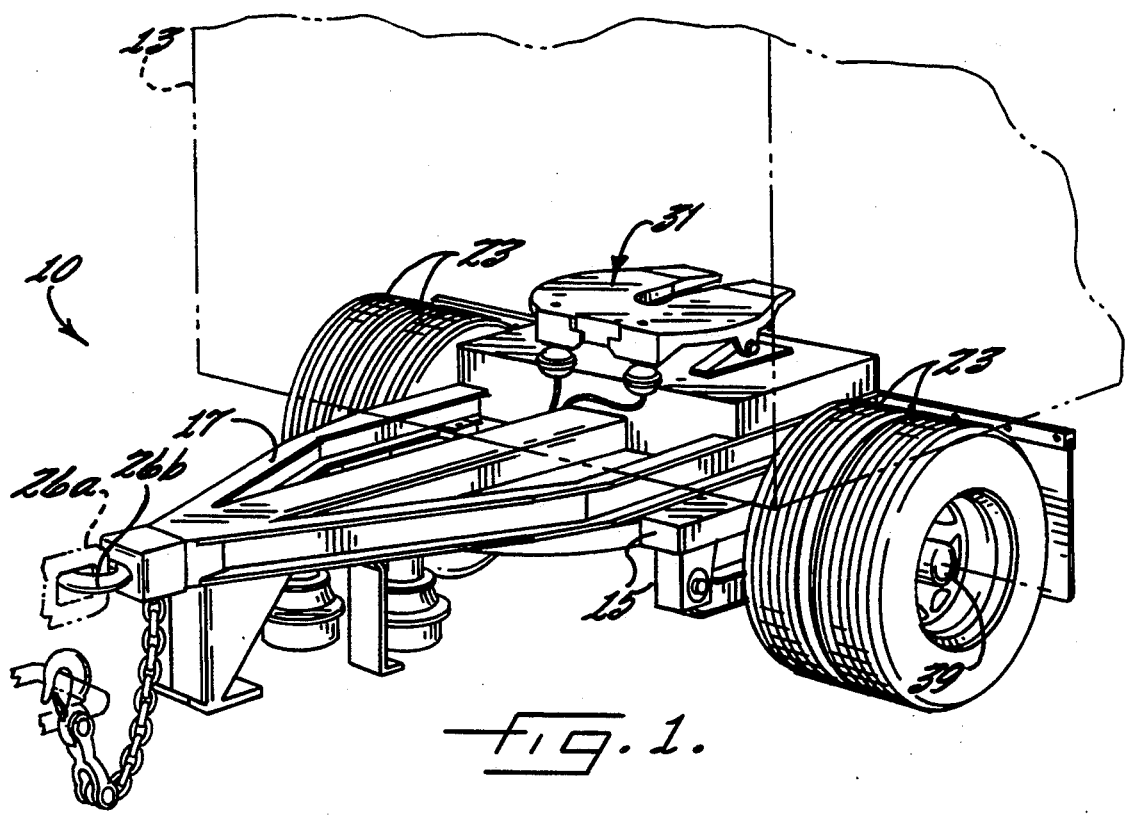
FIG. 1 is a perspective view of the converter dolly of the instant invention.

As illustrated in FIG. 1, a converter dolly is shown generally by the reference numeral 10, and the dolly is shown connecting a first wheeled vehicle or trailer 12 and a second wheeled vehicle or trailer 13. The first trailer can be connected to a tractor by a fifth wheel and kingpin arrangement commonly known in the art or the first trailer can be integral with a tractor chassis. The converter dolly 10 is particularly well suited to facilitate backing up the trailers together without having to disconnect them.

As illustrated in the various figures, the converter dolly 10 comprises a base 15, a connector frame 17, dolly locking means 21 and a plurality of ground engaging wheels 23 carried by the base 15. The connector frame 17 of the converter dolly is adapted to be pivotally connected to the rear of a front first trailer 12 about a substantially vertical axis for relative horizontal movement therewith. The pivot connection can be made by a pintle hook 26a in conjunction with a tow bar 26b or other hitching means (e.g., ball coupling, ball socket, etc.) extending forwardly from the connector frame 17.

The rear end of the connector frame 17 of the converter dolly includes a fifth wheel assembly 31 fixed on the connector frame 17. The fifth wheel assembly 31 includes means for coupling the converter dolly 10 to the second wheeled vehicle or trailer 13 in a manner permitting pivotal movement therebetween. The means for coupling, in the most preferred embodiment, includes a plate portion 34 having a longitudinal slot 35 formed centrally therein and adjacent to its front end. A kingpin 36, shown in horizontal cross-section in FIG. 2, projects from an underside of the second wheeled vehicle 13 and is received by the slot 35 of the plate portion 34. The kingpin 36 is secured and locked in place by conventional means known in the art. The fifth wheel assembly 31 includes fifth wheel locking means generally shown at 38. The base 15 and connector frame 17 are connected, in the most preferred embodiment, by a bolt or pin 37 (See, FIG. 5) which permit substantially horizontal movement about a vertical axis. One or more feet 40 connect the fifth wheel assembly 31 with the connector frame 17. However, it is to be understood that any conventional method may used to pivotally connect the two portions of the dolly frame. Thus, the base can be rotated in relation to the connector frame and vice versa.

Figure 2:
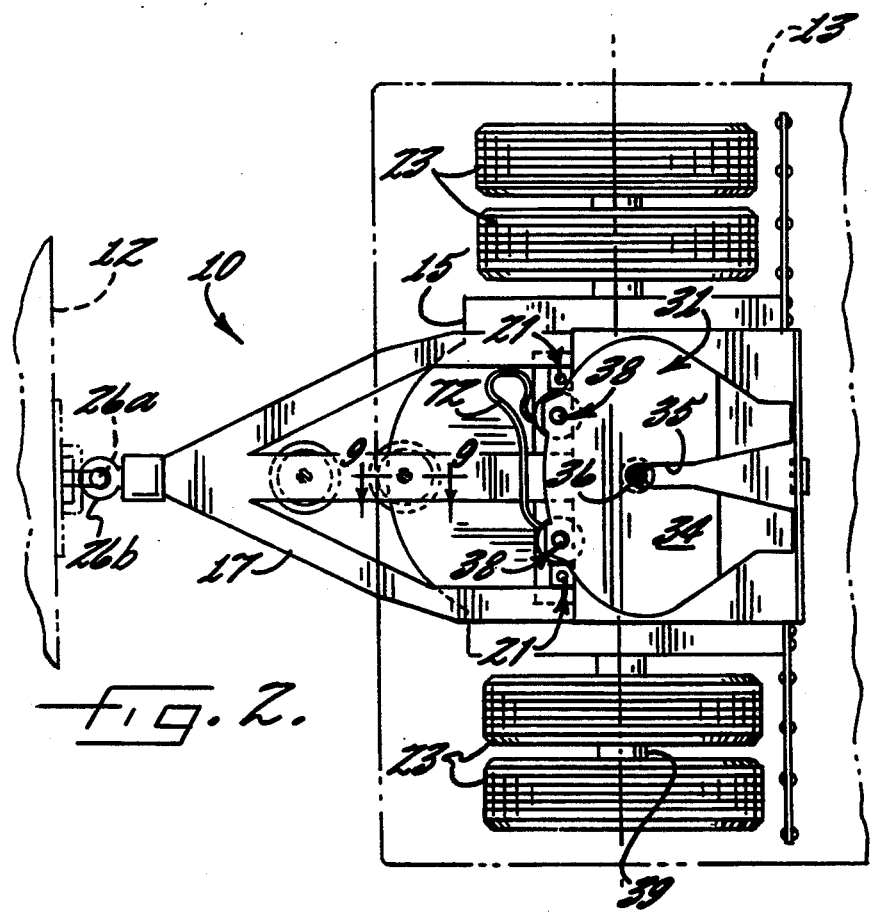
FIG. 2 is a top plan view of the converter, dolly of the instant invention.

The base 15 is mounted on ground engaging wheels 23 carried by an axle 39 best seen in FIG. 2. Because the converter dolly 10 of the instant invention is formed of a two-part frame, an additional pivot point is provided which increases the versatility and flexibility of the converter dolly of the present invention.

The dolly of the present invention is particularly advantageous over prior art dollys in that the trailer assembly may easily be backed up without uncoupling the trailers making the dolly operator friendly. This feature is achieved by dolly locking means 21 and fifth wheel locking means 38. The fifth wheel locking means 38, as stated above, is carried by the fifth wheel assembly 31 and when activated, the fifth wheel locking means 38 prohibits rotational movement between the connector frame 17 of the dolly and the second trailer 13. The dolly locking means 21 are carried by the base 15 of the converter dolly 10 and, when activated, prohibits rotational movement between the connector frame 17 and base 15 of the converter dolly 10.

The fifth wheel locking means 38 preferably includes a pair of fifth wheel locking means pins 41 in housings 43 which are carried by the fifth wheel assembly 31 so that when the fifth wheel assembly 31 pivots up or down, the pins 41 and housings 43 will move as a unit with the fifth wheel. This prevents pins 41 from being sheared off or broken due to the pins staying in a fixed position relative to the fifth wheel when the fifth wheel pivots, creating a shear force against the pins. The pins 41 are moveable between a retracted inactive position in apertures 48 located in the bearing plate 49 carried on the underside of the second trailer 13. The retracted, inactive position permits pivotal movement of the second trailer 13 in relation to the converter dolly 10.

The dolly locking means 21 is carried by the base 15 of the dolly 10 and comprises a set of dolly locking means pins 51 received by apertures 54 located on the underside of the connector frame 17 of the dolly when pins 51 are in an extended, active position as is shown in FIG. 5. The dolly locking means 21 preferably includes openings or housings 61 to protect pins 51. Thus, the retracted, inactive position of pins 51 permits pivotal movement of the base of the dolly in relation to the connector frame of the dolly.

The fifth wheel locking means pins 41 and the dolly locking means pins 51 may be extended by motor means such as, in a preferred embodiment, a fluid-powered motor using pneumatic or hydraulic methods known in the art. Referring to FIGS. 5 and 8, the fifth wheel locking means pins 41 can be extended using diaphragms 68, in communication with an air pressure source 72 and retracted using spring means (not shown). The dolly locking means pins 51 are spring biased in an extended position such that when air pressure is not applied to the pins, they remain in the extended position. The control means for the pneumatic system may be remotely actuated and may be installed for operator convenience in the cab of the tractor. Such an arrangement is desirable to easily and effectively facilitate both forward and backward motion of the entire trailer assembly.

Specifically, in FIGS. 3–5 the operation of the present invention when the trailer assembly is in the forward motion position is shown. When it is desired to move the trailer assembly in the forward direction, in the most preferred form of the invention, the driver will remotely deactivate the air pressure source 72 communicating with the set of fifth wheel locking means pins 41 on the fifth wheel assembly 31. This will disengage the pins 41 from the extended, active position by spring means such that the connector frame 17 of the dolly is free to rotate horizontally about a vertical axis relative to the bearing plate 49 of the second trailer 13 as best seen in FIGS. 4 and 5. At the same time, no air pressure will be applied to the pins 51 of the dolly locking means 21, and the pins being spring biased to an extended position, will move to an extended, engaged position prohibiting rotational movement between the base 15 and connector frame 17 of the dolly 10.

Referring to FIGS. 6–8, when it is desired to move the trailer assembly in a backing up motion, then pins 51 of the dolly locking means 21 are remotely actuated. In operation, the driver will remotely actuate the air pressure source via diaphragm 69 communicating with the set of pins 51 on the base 15. This will pneumatically disengage the pins 51 from the spring biased, extended position such that the base 15. and axle 39 of the dolly 10 is permitted to rotate in relation to the second trailer 13. The air pressure source communicating with the fifth wheel locking means pins 41 is correspondingly supplied and pins 41 thus engage preventing any rotational movement between the base fifth wheel 31 of the connector frame 17 of the dolly 10 and the bearing plate 49 of the second trailer 13.

FIGS. 10 and 12 depict the pivotal relationship between the connector frame and base described above. Reference numeral 80 represents the true center point located by the intersection of an longitudinally extending center line and a horizontally extending center line running parallel with the line formed by the axle of the converter dolly wheels (see FIG. 7). The actual pivot point between the connector frame and base of the dolly frame is located behind the true center as shown by cross bar 81 in FIGS. 10 and 11. In the most preferred embodiment of the instant invention, this pivot point will be located along the longitudinal center line but behind the horizontal center line such that the degree of rotational is limited. In the most preferred form of the invention, less than about a 25 degree rotation would be desired in order to prevent over rotation or jack-knifing of the converter dolly. The selection of other degrees of rotation will be within the skill of one in the art.

To further prevent over rotation of the base 15 and wheel assemblies when they are pivotally rotatable in relation to the connector frame, a downwardly extending stop 84 shown best in FIG. 7 is provided on the end of the connector frame 17. This stop, upon rotation of the base 15 in relation to the connector frame 17, is stopped from further rotation by an obstruction such as the contour of the base 15. As seen in FIG. 7, stop 84 is abutting the outline of the base 15 and rotation past a desired degree is prohibited. In the most preferred form of the invention, that would be less than about 25 degrees.

A third locking means including fail-safe pin 85 is provided as an additional safety feature. This pin 85 is actuated by a solenoid 86, most preferably one in the range of 12 volts, in communication with the back-up light circuit 87 so that when the back-up light circuit 87 are not actuated by the driver, such as when the trailer assembly is in forward motion, the fail-safe pin 85 will not be disengaged from an extended, active position. This thus prevents the driver from accidentally activating the converter dolly 10 into a backing up position which permits pivotal movement between the connector frame 17 and base 15 of the dolly 10 while the trailer assembly is in forward motion. FIG. 9 shows the fail-safe pin 85 in an extended, active position such as in the forward motion position shown in FIG. 3, while FIG. 11 shows the fail-safe pin 85 in the retracted, inactive position.

Figure 13:
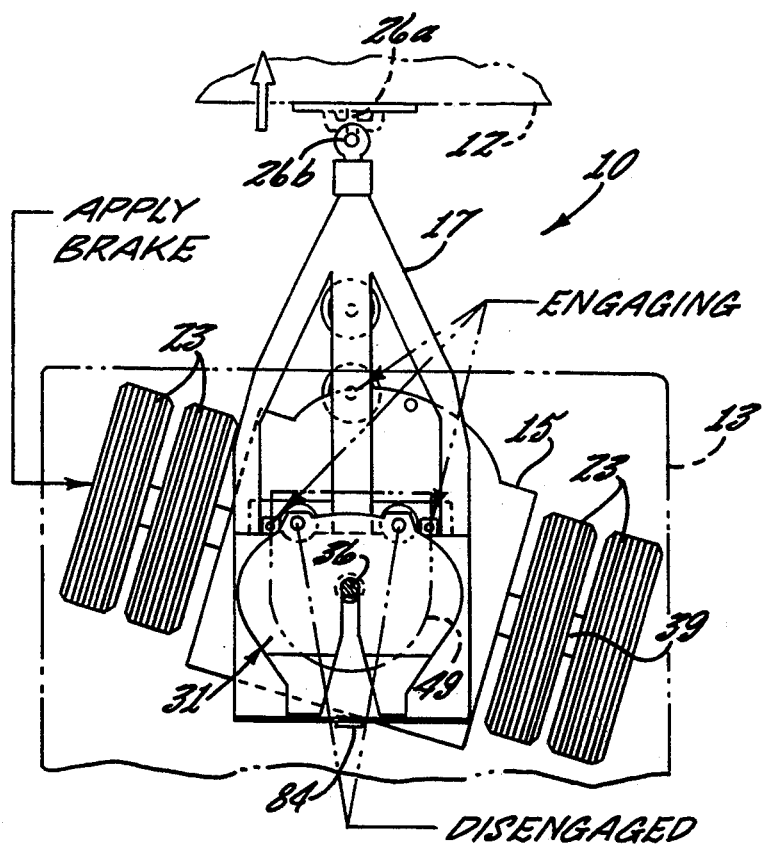
FIG. 13 is a top plan view of the converter dolly illustrating the operation of the shuttle braking system.
Figure 14:
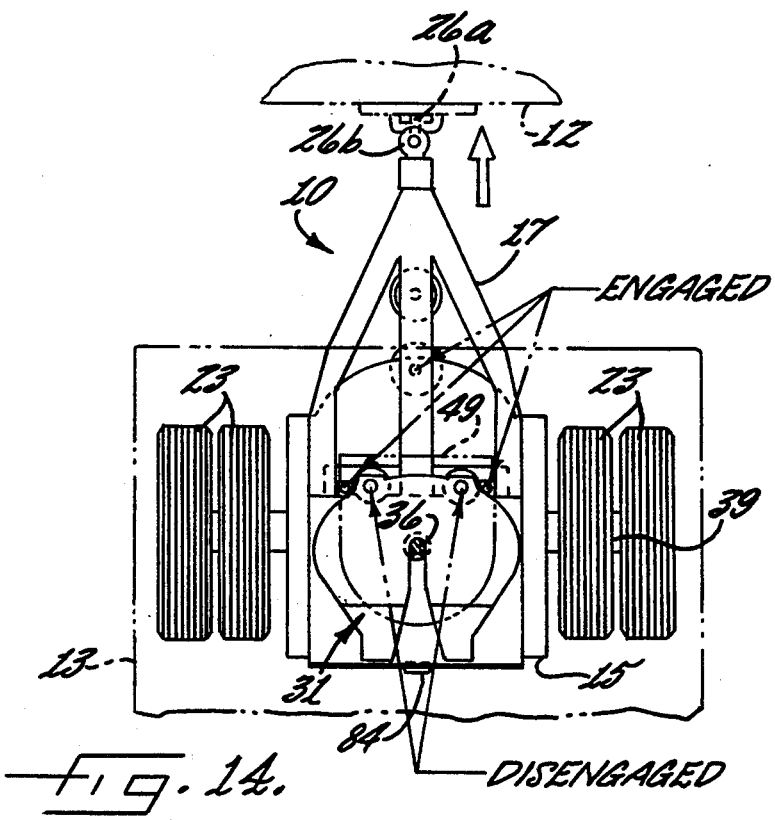
FIG. 14 is a top plan view similar to FIG. 13 wherein the dolly is in proper alignment.

A further advantageous feature of the converter dolly 10 of the instant invention is that the trailer assembly may easily recover from the backing up position to the forward motion position. This recovery process is achieved by the shuttle system which is incorporated with the braking system of the converter dolly. The brakes on the dolly are conventional and the operation of which will be known to an ordinarily skilled artisan in the field. The shuttle system operates in the following manner: when the trailer assembly has been reversed, such as for loading or unloading, the converter dolly and two trailers likely will not be aligned. This is depicted in FIGS. 13 and 14. Thus, if the driver were to actuate the dolly into its forward motion mode, the base 15 and connector frame 17 of the dolly 10 would not be in alignment and the pins thereof would not be aligned with their respective apertures and would not be able to seat as best shown in FIG. 13. Thus the shuttle system is provided to assist the driver in bringing the trailers and converter dolly 10 into alignment prior to actuating the forward motion mode of the converter dolly 10.

The shuttle system manipulates the preexisting brakes such that the brakes are applied to the forward most wheel or wheels which remain in place until the other wheel or wheels come into alignment therewith. The driver having shifted into forward gear in order to manipulate the shuttle system, automatically has engaged the spring biased fail-safe pins 85 which automatically locks into the base 15 upon alignment. The driver may then actuate the forward motion position as fifth wheel locking means 38 will be aligned and fifth wheel locking means pins 41 may assume the retracted, inactive position out of apertures 48 and dolly locking mean pins 51 may assume the extended, active position within apertures 54 as depicted best in FIG. 14. The shuttle system is remotely actuated, most preferably by the driver within the cab of the tractor.

While particular embodiments of the invention have been described, it will be understood, of course, the invention is not limited thereto since modifications may be made by those skilled in the art, particularly in light of the foregoing teachings. It is, therefore, contemplated by the appended claims to cover any such modifications as incorporate those features of these improvements within the true spirit and scope of the invention.

That which is claimed:

1. A converter dolly for a tandem trailer assembly including a forward wheeled vehicle with a backup light circuit and a rear wheeled vehicle, said converter dolly comprising:

a base;

a connector frame pivotally connected to said base for substantially horizontal movement about a substantially vertical axis, said connector frame including a hitch means for pivotally connecting said connector frame to said forward wheeled vehicle for horizontal movement about a substantially vertical axis and a fifth wheel assembly fixed on said connector frame to pivotally connect said connector frame to said rear wheeled vehicle for substantially horizontal movement about a substantially vertical axis, said fifth wheel assembly including fifth wheel locking means having an unengaged position and an engaged position for preventing rotational movement between said connector frame and said rear wheeled vehicle in its engaged position;

dolly locking means having an unengaged position and an engaged position for preventing rotational movement between said base and said connector frame in its engaged position; and a plurality of ground engaging wheels carried by said base.

2. A converter dolly according to claim 1 wherein said dolly locking means is in its unengaged position when said fifth wheel locking means is in its engaged position.

3. A converter dolly as in claim 1 comprising:

at least one fifth wheel locking means pin and at least one dolly locking means pin;

said dolly locking means pin is moveable from a retracted to an extended position wherein in the extended position said dolly locking means pin on said base engages an aperture located in an underside of the connector frame; and said fifth wheel locking means pin is moveable from a retracted to an extended position wherein in the extended position said fifth wheel locking means pin engages an aperture located in a bearing plate located on a surface of said rear wheeled vehicle.

4. A converter dolly as in claim 3 wherein said fifth wheel locking means pins and said dolly locking means pins are surrounded by pin housings such that when said pins move up and down, the housings remain stationary with the base and the connector frame.

5. A converter dolly as in claim 4 wherein motor means are operatively connected with said pins to move them between a retracted, inactive position for permitting rotational movement between the connector frame and the rear wheeled vehicle to an extended, active position for preventing rotational movement between the connector frame and the rear wheeled vehicle.

6. A converter dolly as in claim 5 wherein said motor means is a fluid-powered motor.

7. A converter dolly as in claim 6 wherein said fluid powered motor comprises a pneumatic system including a diaphragm in communication with an air pressure source.

8. A converter dolly as in claim 5 wherein said pins are spring biased in an extended, active position when said motor means is not activated.

9. A converter dolly as in claim 1 wherein a fail-safe pin is disengaged when the back-up light circuit of said forward wheeled vehicle is activated.

10. A converter dolly as in claim 1 wherein a fail-safe pin is cooperatively associated with at least one back-up light circuit located on said forward vehicle such that said fail-safe pin will only permit rotational movement between said connector frame and said base when said back-up light circuit is energized.

11. A converter dolly of claim 10 wherein said fail-safe pin is activated by a solenoid electrically connected to said back-up light circuit.

12. A converter dolly as in claim 1 wherein said connector frame includes a stop to prevent the base of the dolly from rotating too far.

13. A converter dolly as in claim 12 wherein the stop is located at a rear portion of the connector frame such that said stop engages an obstruction located upon said base once a predetermined degree of rotation has been reached.

14. A converter dolly as in claim 1 further including:

a braking system;

said braking system comprising a shuttle system to permit said base to be properly aligned with said connector frame after said assembly has been moved in a reverse direction such that said assembly can then be moved in a forward position, said shuttle system comprises brake means operatively associated on each side of said converter dolly with said wheels such that when it is desired to move said assembly in a forward motion subsequent to a reverse motion, the wheels on one side of said converter dolly which are furthermost forward are prevented from moving until said other wheels are brought into alignment therewith, and wherein once said wheels are aligned, said shuttle system is deactivated, said dolly locking means on said base is activated, and said vehicle may be moved forward.

15. The converter dolly of claim 1 in combination with a first wheeled vehicle and a second wheeled vehicle to provide a tandem trailer assembly.

* * * * *